Z. R. DELLA VENERIA.
PRESSURE GAUGE.
APPLICATION FILED JAN. 19, 1921.

1,437,728.

Patented Dec. 5, 1922.
2 SHEETS—SHEET 1.

Inventor
Zaverio R. D. Veneria,
By Henry Ott
Atty.

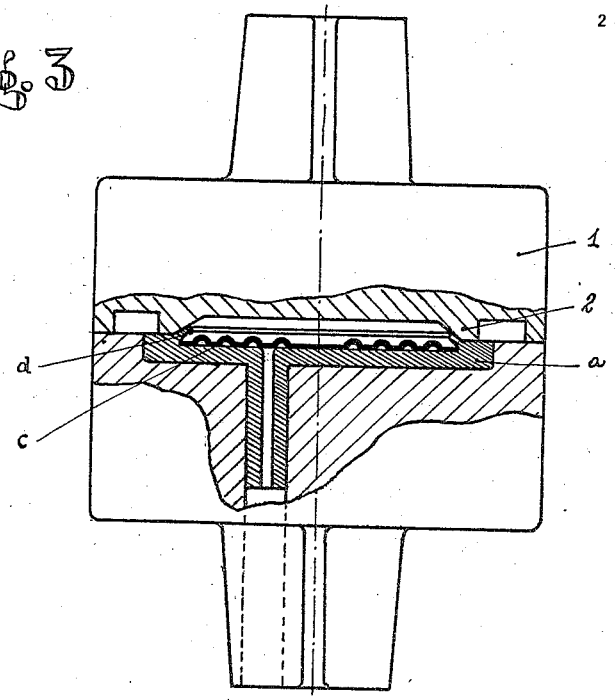
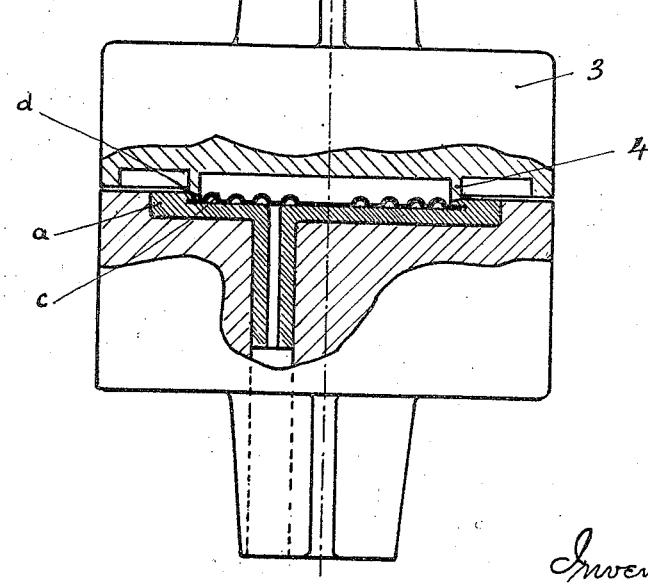

Patented Dec. 5, 1922.

1,437,728

UNITED STATES PATENT OFFICE.

ZAVERIO REVIGLIO DELLA VENERIA, OF TURIN, ITALY.

PRESSURE GAUGE.

Application filed January 19, 1921. Serial No. 438,366.

*To all whom it may concern:*

Be it known that I, ZAVERIO REVIGLIO DELLA VENERIA, a subject of the King of Italy, and resident of Turin, in the Kingdom of Italy, have invented certain new and useful Improvements in Pressure Gauges; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The pressure gauges generally used are of the Bourdon type in which, as is well known, the action depends on the deformation produced under pressure in a metal tube of flattened or elliptic cross-section. This deformation, multiplied by means of levers or gearing, is transmitted to a pointer which indicates the value of the pressure on a graduated dial. A spring, usually a coil spring, opposes the deformation of the tube and keeps the pointer constantly in connection with the tube so that play or slackness in the transmission is eliminated. In each gauge the dimensions of the tube are proportionate to the range of pressure to be measured. Thus, for low pressure the tube must be of small thickness, and this renders it very delicate and liable to dangerous deformation should the pressure exceed the maximum for which the gauge is designed.

Gauges intended for measuring low pressure (0.5 to 3 or 4 metres of water column) have been adopted wherein metallic membranes replace the bent tubes of the Bourdon gauges, but it has been necessary to use membranes of considerable diameter and, in certain cases, to double or triple them, in order to obtain deformations, and consequently indications of measurable amplitude. Further, the membranes easily get out of shape so that readjustment is soon required. All this lessens the practical utility of such gauges and renders them clumsy and inconvenient.

The object of the present invention is to provide improvements in pressure gauges of the membrane type, which shall eliminate the hereinbefore mentioned disadvantages and enable small membranes to be used without losing their shape and elasticity.

One form of gauge in accordance with the invention is shown, by way of example, on the accompanying drawing, whereon:—

Figure 1:
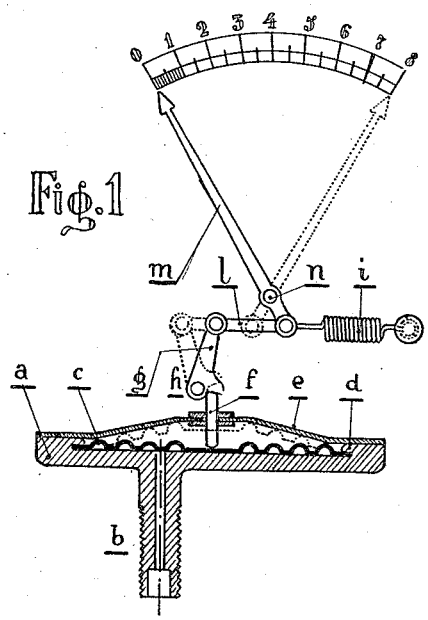
Figure 2:
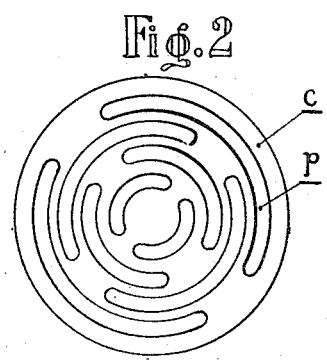

Fig. 1 is a diagrammatic view of the gauge and Fig. 2 a plan view of the membrane. Figs. 3 and 4 are elevations, partly in section, of two dies employed for forming a swaged connection between the membrane and its casing.

Referring to the drawing, —a— denotes a casing, made of brass or other suitable material, and having a screw threaded hollow extension —b—. A metallic membrane —c— is arranged within the casing, being clamped tightly in position at its outer edge by a beading —d— forming an integral part of the casing.

The beading —d—, prior to placing the membrane —c— on the casing, projects upward from the bottom of the latter as shown in Fig. 3 and after the membrane has been placed on the bottom the beading is bent or swaged onto the member as shown in Fig. 4.

In the first stage of the operation (Fig. 3) the circular beading —d— is bent inwards by means of a swage 1 provided with a circular projection 2 the inner edge of which is made conical. In the second stage, the beading —d— is pressed against the membrane —c— near its outer edge by means of a swage 3 provided with an annular projection 4. The casing is closed by a cover plate —e— preferably of sheet metal. Slidable in an opening in the centre of the cover —e— is a pin —f— which bears, at one end, on the membrane —c— and, at the other end, on a lever —g— pivoted at —h— and held in the position of rest by a spring —i— acting on a rod —l—. The rod —l— connects the lever —g— with an index —m— pivoted at —n— and arranged to move over a graduated scale —o—.

The membrane —c— is of thin sheet metal and has a plurality of concentrically arranged corrugations —p— each interrupted in places and the interruptions, in one corrugation being disposed in staggered relationship to those in the next corrugation, as shown in Fig. 2. In the position of rest the membrane —c— bears on the internal bottom wall of the casing —a— as shown in full lines in Fig. 1. When the extension —b— is connected with a reservoir or other container subjected to internal pressure, the membrane —c—, which is rendered elastic by the corrugations —p— rises and, should the pressure be equal to or greater than the predetermined maximum, the membrane will continue to rise until it contacts with the cover —e—. The position of the parts will then be as shown in dotted lines Fig. 1.

In its movement the membrane —c— carries with it the pin —f— and so turns the lever —g— thereby moving the rod —l— against the action of the spring —i— and consequently moving the index —m— to a position on the scale —o— indicative of the pressure prevailing. When the pressure ceases the membrane —c— returns to its initial position, resting on the bottom of the casing —a—, and the spring —i— then causes the index —m—, together with the lever —g— and the pin —f—, to return to the original position also.

From the foregoing it is clear that:—

A.—The membrane —c— cannot undergo permanent deformation, both by reason of its partly undulated form, which allows it a certain degree of flexibility whilst offering the necessary resistance through the solid intervals that are left between the circular undulations, and because it is adapted to be brought to rest against the cover —e— which limits its rising movement and thus renders impossible any deformation in excess of that permitted within the limit of flexibility. In this way there can be no variations in the indication given for each particular pressure even if the gauge is subjected to pressures much greater than those for which it is designed.

B.—The extreme positions of the index remain constant and special stoppers for limiting the index in these positions are not necessary. (In pressure gauges of other types these stoppers often cause displacement of the hands or pointers which then no longer indicate accurately). When the gauge is at rest the spring —i— carries the membrane —c— back on to the bottom of the casing —a— and moves the index —m— exactly back to zero; at the maximum pressure the membrane always rests against the upper bell-shaped cover —e— and consequently the extreme position of the index is also accurately determined.

C.—The spring —i— does not require any special adjustment; and if the load and tension thereon be varied, the range of the pressure gauge can be correspondingly varied within limits.

If desired, the dial carrying the scale —o— may be arranged in the same plane as the membrane —c— and suitable gearing may be used to transmit the movements of the membrane.

A gauge as herein described is simpler and less costly to construct than known gauges having flexible tubes.

The membrane —c— being secured at its outer edge in the manner described makes a tight joint without requiring soldering or welding which would be liable to render it rigid or alter its shape.

Claims.

1. In a pressure gauge, a metallic membrane having concentrically arranged corrugations which are interrupted by non-corrugated parts, the interruptions in one corrugation being disposed in staggered relation to the interruptions of the adjacent corrugations.

2. A pressure gauge comprising a casing having an integral annular clamping bead formed on its outer edge, a metallic membrane clamped within said casing by said bead and having a plurality of concentric corrugations which are interrupted at intervals, the interruptions of one corrugation being disposed in staggered relation to the interruptions of the adjacent corrugations.

In testimony that I claim the foregoing as my invention, I have signed my name.

ZAVERIO REVIGLIO DELLA VENERIA.